United States Patent [19]

Stamm

[11] Patent Number: 4,464,715
[45] Date of Patent: Aug. 7, 1984

[54] MEMORY ACCESSING METHOD

[75] Inventor: David A. Stamm, Santa Clara, Calif.

[73] Assignee: Daisy Systems Corporation, Sunnyvale, Calif.

[21] Appl. No.: 351,651

[22] Filed: Feb. 24, 1982

[51] Int. Cl.³ .............................................. G06F 13/00
[52] U.S. Cl. ............................................................ 364/200
[58] Field of Search ... 364/200 MS File, 900 MS File; 365/222

[56] References Cited

U.S. PATENT DOCUMENTS 4,249,247  2/1981  Patel ................................. 364/900

Primary Examiner—Raulfe B. Zache
Attorney, Agent, or Firm—Blakely, Sokoloff, Taylor & Zafman

[57] ABSTRACT

A memory accessing method is described which is particularly useful with the Multibus where a dynamic memory is employed. When the memory is accessed without a refresh collision, a ready signal is generated before the acknowledgement signal. This saves considerable time since the time between the placement of the data on the bus and the CPU's sensing of the data is reduced.

11 Claims, 5 Drawing Figures

READ CYCLE — NO REFRESH COLLISION (PRIOR ART)

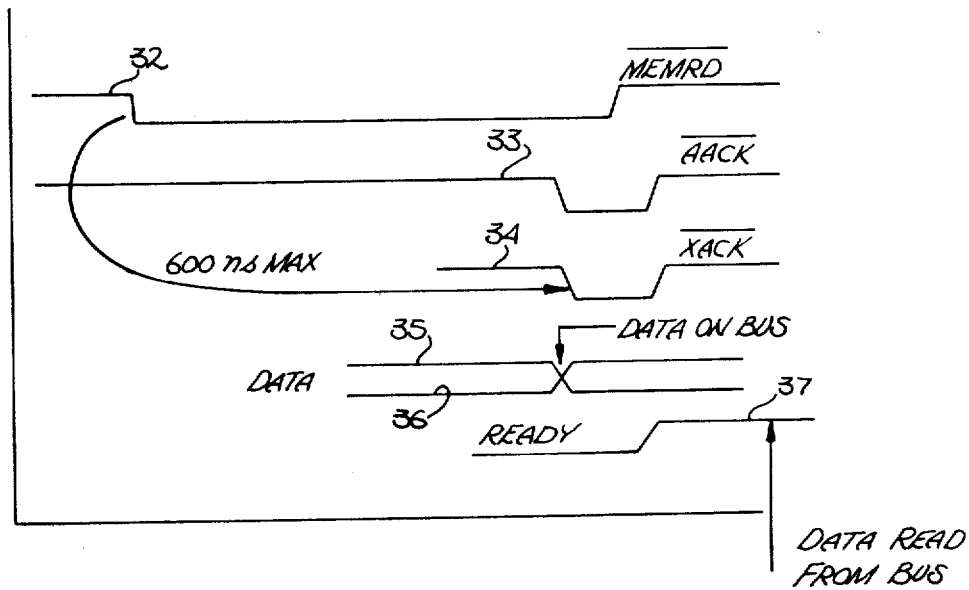
Fig. 3 READ CYCLE—REFRESH COLLISION
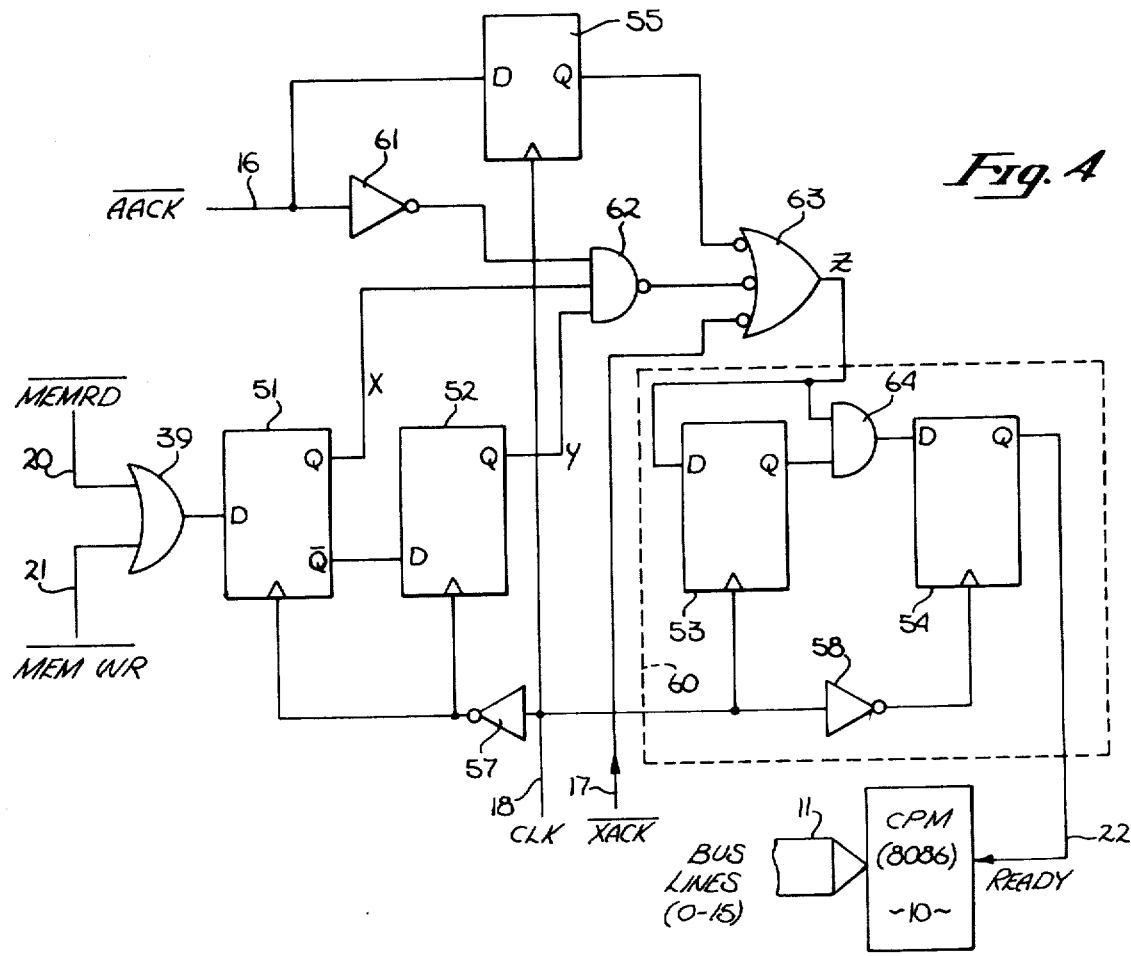
Fig. 4

MEMORY ACCESSING METHOD

BACKGROUND OF THE INVENTION

1. Field of the Invention

The invention relates to the field of memories, particularly the accessing of dynamic, random-access memories by central processing units.

2. Prior Art

Many computer systems, particularly microcomputers, employ dynamic, random-access memories which are accessed directly by central processing units (CPU). These memories require periodic refresh cycles and often these cycles are asynchronous with CPU operation. Consequently, a collision can occur between a memory access cycle such as a read cycle and a refresh cycle. Most often, the read cycle is aborted in favor of the refresh cycle, since otherwise the data in the memory might be lost. Obviously, when this occurs the operation of the CPU is slowed. A memory provided "not ready" signal is used in some cases to indicate a collision and then to inactivate clock cycles associated with CPU operations. To make use of this time, often these cycles are used for internal CPU housekeeping.

Most often, these memories provide a data valid signal or the equivalent (e.g., acknowledge) to indicate that data has been accessed and is on the computer bus. This signal which may occur asynchronously with the computer operation is converted to a ready signal which is synchronized with the computer operation. The CPU then acts on the ready signal to sense the data on the bus or to write data onto the bus. In some cases an advanced data valid signal (referred to as advanced acknowledge) is provided by the memory to indicate that accessing will occur without collision with a refresh cycle. The absence of this pulse, by way of example, can be used to allow the CPU to do other functions while waiting for the refresh cycle to be completed and for data to be accessed.

The typical protocol for accessing a memory in a microcomputer results in a time gap between the time when the memory couples data to the bus and when the CPU senses the data even when collision occurs. One full clock cycle is lost with this protocol and this can result in a loss of up to 40% of the CPU's time. This will be explained in more detail in conjunction with FIG. 2.

As will be seen, the present invention reduces the accessing time for those cycles where collision does not occur.

SUMMARY OF THE INVENTION

A method is described for shortening the access time for memory accesses which occur without collison with refresh cycles. The method is particularly useful in a computer system which includes a central processing unit (CPU) and a dynamic memory which provides an advanced data valid signal or equivalent signal. In these systems, the CPU provides an access signal to the memory when the memory is to be accessed and data is actually accessed from the memory in synchronous with a control clock signal after receipt of a ready signal. The memory provides a data valid signal or equivalent signal to indicate that data is ready for reading and an advanced data valid signal which indicates that the memory is being accessed without collision with a refresh cycle. The method includes the initiation of a timing sequence based on the occurrence of the access signal from the CPU. This sequence is allowed to continue only if the advanced valid data signal is present. A ready signal is generated at the end of this timing sequence without regard to the data valid signal. In effect, a ready signal is generated before the data is valid, however, by the time the CPU actually senses the data, the data has become valid.

BRIEF DESCRIPTION OF THE DRAWINGS

FIG. 3 is a series of waveforms illustrating some of the timing signals for the system of FIG. 1 during a read cycle where no refresh collison occurs.

FIG. 4 is an electrical schematic of the presently preferred apparatus used with the invention.

DETAILED DESCRIPTION OF THE INVENTION

An improved memory accessing method and apparatus is described which is particularly useful for accessing data from a dynamic memory in a computer system. In the following description, numerous specific details are set forth such as specific cycle times and part numbers in order to provide a thorough understanding of the present invention. However, it will be obvious to one skilled in the art that the present invention may be practiced without these specific details and parts. In other instances, well-known circuits, protocols, etc., are not set forth in detail in order not to obscure the present invention in unnecessary detail.

The invention in its preferred embodiment is used in a computer system which employs an 8086 as the central processing unit. The ordinary dynamic memory system which requires periodic refresh cycles is coupled along with the CPU to a Multibus. An ordinary clock generator (8284) is also used in this system for generating clock signals.

Figure 1:
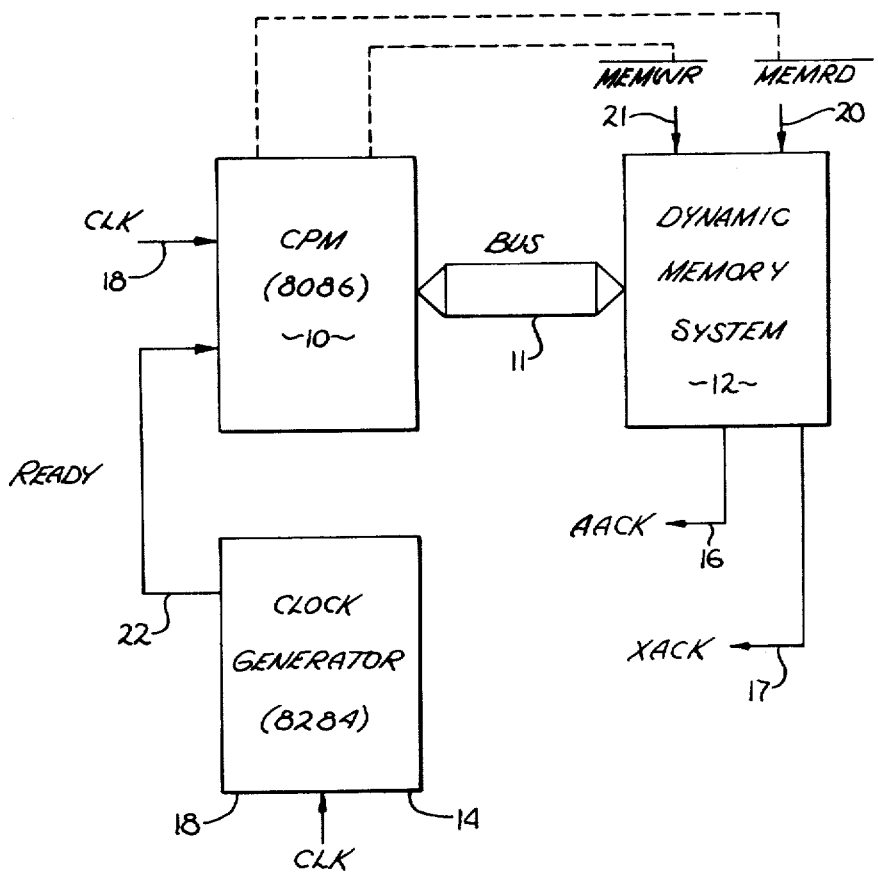
FIG. 1 is a general block diagram illustrating a central processing unit, memory, interconnecting bus and a clock generator.

Referring now to FIG. 1, the CPU 10 is shown coupled to the dynamic memory system 12 via a bus 11. A standard clock generator 14 provides a plurality of signals to the CPU 10. For purposes of this application, only the ready signal on line 22 is shown. Both the CPU 10 and generator 14 receive the control clock signal on line 18; in the presently preferred embodiment, an 8 mHz signal is used, however, this is not at all critical to the present invention. The memory system provides an advanced acknowledge signal (AACK/ on line 16) and an acknowledge signal (XACK) on line 17. Typically, these are coupled to the generator 18 and used to generate signals for the CPU. The CPU provides signals to the memory to initiate read and write cycles shown as MEMRD/ (line 20) and MEMWR/ (line 21), respectively. These signals are shown coming from the CPU 10 with dotted lines since they are not direct signals, but rather, are decoded from other signals provided by the CPU.

The operation of the system of FIG. 1 and of the present invention are described in conjunction with a read cycle. It will be apparent to one skilled in the art that the invention is not limited to read cycles, but may, for instance, be used for a write cycle or other accessing of the memory.

Figure 2:
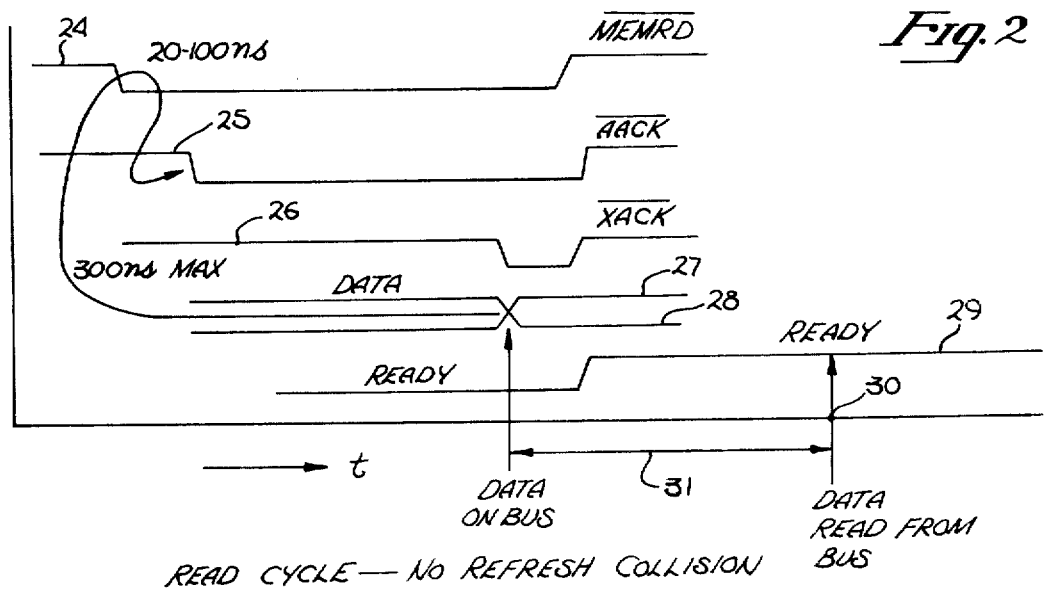
FIG. 2 is a series of waveforms illustrating some of the timing signals for the system of FIG. 1 during a read cycle when a refresh collision occurs.

Referring now to FIGS. 1 and 2, assume that the CPU 10 is to access the memory 12 and more specifically, that it is to read data from the memory 10. The waveform 24 of FIG. 2 (MEMRD/) is coupled to the memory system 12 via line 20 at the beginning of a read cycle. The memory system upon receiving this signal determines if reading of the memory will interfere with a refresh cycle which is either in process or which must be performed. If reading can occur without collision with refreshing, then the memory system provides an advanced acknowledge signal shown by waveform 25 (AACK/). (In the presently preferred embodiment and for purposes of explanation, it will be assumed that the AACK/ signal if it is to drop in potential will do so between 20 and 100 nanoseconds after the MEMRD/ signal is coupled to the memory.) Now in an ordinary manner the address signals are coupled to the memory via the bus 11. When the data has been accessed and placed on the bus 11 the XACK/ signal drops in potential as shown by waveform 26. At this time the data is valid as indicated by the data valid signal 27 and its complement signal 28. The XACK/ signal is sensed by the clock generator 14 and on the next clock signal (on line 18) a ready signal is generated and coupled to the CPU 10. This ready signal is shown by waveform 29.

It should be noted that the XACK/ signal as well as the AACK/ signal are not synchronized with the clock signals, that is, they can occur at any time with respect to the clock signals. On the next clock signal, after receipt of the ready signal as indicated at time 30 in FIG. 2, the data is read from the bus. Data is then on the bus for the period 31 before it is actually sensed. This period will be at least 125 nanoseconds for the described embodiment and can approach twice that number. In a typical memory having an access time of 300 nanoseconds maximum, it is seen that considerable time is lost to verify that data is valid and then to sense it.

Referring to FIG. 3, the waveforms for the system of FIG. 1 are illustrated during a read cycle when a collision occurs between the read cycle and a refresh cycle. The waveform 32 illustrates the CPU's initiation of the read cycle. This time, however, the AACK/ signal does not drop in potential in the 20–100 nanosecond period as it did in FIG. 2. Rather, when the data is valid, both the AACK/ and XACK/ signals drop in potential. This is shown by waveforms 33 and 34 and by the data valid signals 35 and 36. Once again, the XACK/ signal is used to generate a ready signal as shown by waveform 37 and then on the next control clock signal the data is sensed on the bus. In a typical memory system when a collision occurs, approximately 600 nanoseconds (maximum) lapse between initiation of the read cycle and before the data is valid. However, it should be noted that the frequency of collisions is low (e.g., 10% of read cycles) and thus, most of the time the advanced acknowledge signal (AACK/) occurs within the 20–100 nanosecond period following the initiation of the read cycle.

With the present invention, a timing sequence or logic sequence is initiated with the MEMRD/ signal and in effect, it is assumed that the data will be valid within a predetermined period of time corresponding to the maximum access time of the memory. This sequence is interrupted if the AACK/ signal is not present (in its low state). The ready signal is generated on the assumption that the data will be valid by the time that it will be sensed as will be described in conjunction with FIG. 5.

Figure 5:
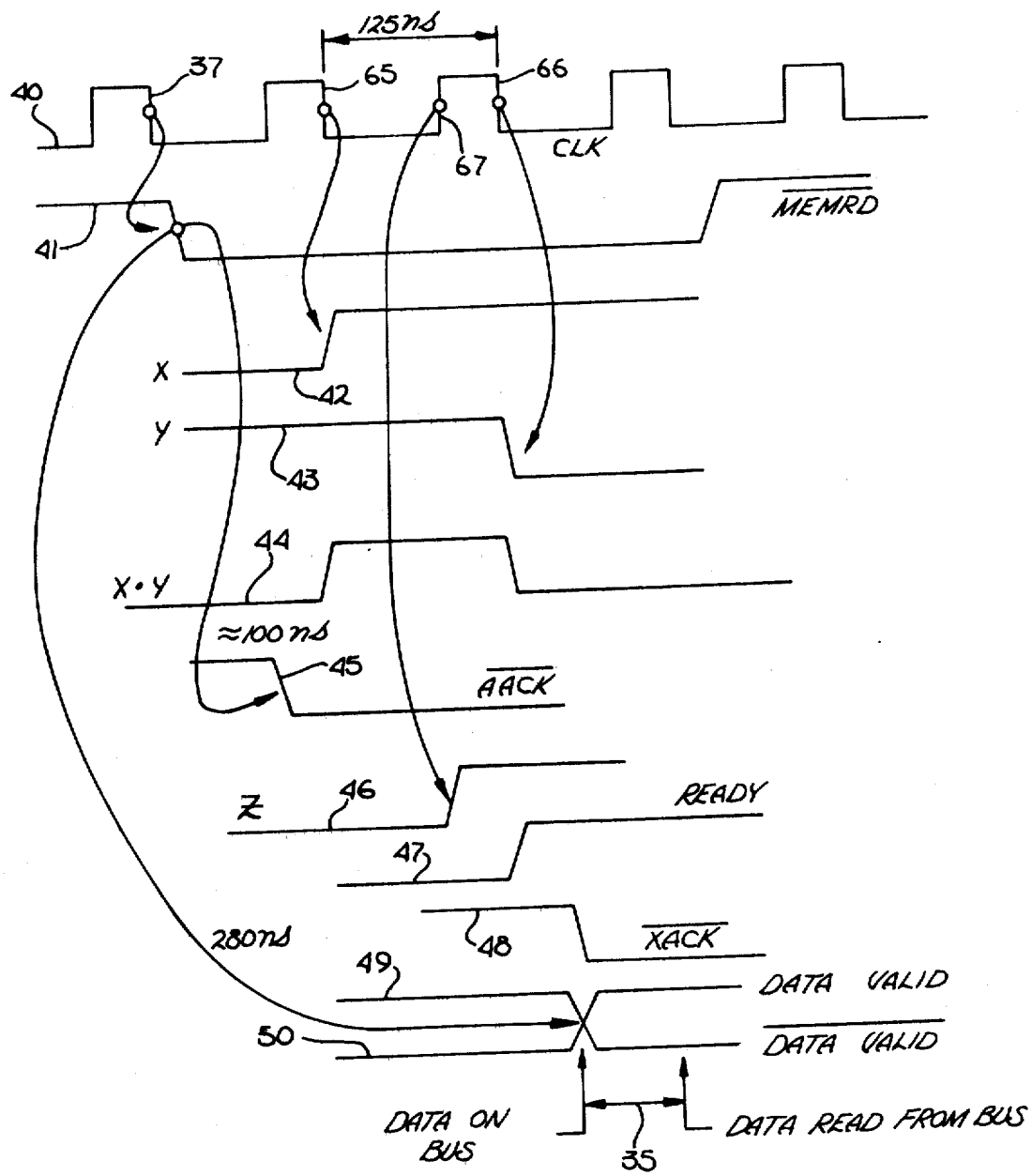
FIG. 5 is a series of waveforms used to explain the operation of the circuit of FIG. 4.

Referring briefly to FIG. 5, the waveform 41 is the MEMRD/ signal, that is, the read request from the CPU. This signal is used along with the computer clock signal (waveform 40) to generate a window illustrated by waveform 44. This window, as will be described, is used to determine if a collision-free read cycle will occur. If no collision is to occur, a ready signal shown by waveform 47 is generated even though the data is not valid. However, the timing, as will be seen, assures that the data will be read after it is valid. The period 35 (the time between when the data is first on the bus when it is read) is substantially shorter than the equivalent period 31 of FIG. 2.

Referring now to FIG. 4, the timing sequence above-mentioned is implemented with a plurality of bistable circuits (flip-flops) and logic gates. All the flip-flops shown are D-type. For these flip-flops, the Q output is set to the state of the D-input on the leading edge of the clock signal applied to the set terminal. The circuitry shown within the dotted lines 60 is internal to the clock, specifically to the 8284. The output of the gate 63 identified as "Z" is coupled to pin 6 of this generator (RDY2) and the output line 22 is coupled to pin 5 (READY).

When both the MEMRD/ and MEMWR/ signals are high (neither reading nor writing), the output of the OR gate 39 is low and the output of flip-flop 51 (X) remains low. This assures that the output from the inverting AND gate 62 is high. XACK/ is also high and since AACK/ is high, the output of the flip-flop 55 is high. A low output thus exists at the output of the gate 63 (Z) and as would be expected a ready signal is not generated by the clock generator.

Assume now that a read cycle is initiated and as shown in FIG. 5 by waveform 41, more specifically by the drop of the MEMRD/ signal. This causes a high input from the OR gate 39 to the flip-flop 51. When next the clock signal drops in potential as shown by edge 65, the flip-flop 51 is set high as shown by waveform 42. (Note that both flip-flops 51 and 52 receive the inverted clock signal from the inverter 57.) The flip-flop 52 initially has a high output as indicated by waveform 43 (Y) and its output will not drop until the following clock cycle (edge 66). In the interim, assuming no collision, the AACK/ signal will be low. This signal passes through the inverter 61, to one of the input terminals of gate 62. Thus, during the "window" shown by waveform 44, all the inputs to the gate 62 are high. The pulse defined by waveform 44 is 125 nanoseconds wide and it occurs after MEMRD/ drops in potential. Therefore, the AACK/ signal which must drop between 20-100 nanoseconds following the initiation of the read cycle will in fact be low during the window defined by waveform 44 for the no collision case. On the leading edge 67 of the clock pulse, the output from the flip-flop 55 is low, the output from gate 62 is low and XACK/ is high. This causes the output of the gate 63 to rise as indicated by waveform 46. When the clock signal next drops in potential as shown by edge 66, a ready signal is generated on line 22 from the flip-flop 54. Note that flip-flops 53 and 54, gate 64 and inverter 58 synchronize the Z signal to the control clock.

It is significant that the ready signal 47 may occur before data is valid. As shown in FIG. 5, by waveforms 47, 48, 49 and 50, the ready signal goes high before the data is valid. However, the data is not actually sensed until another complete clock cycle (125 nanoseconds) and by that time even assuming maximum access time of the memory, the data will be valid. Since the read cycle is always initiated following a clock cycle such as following edge 37, the data will not be sensed at a time sooner than the maximum access time of the memory.

Referring again to FIG. 4, assume now that a read cycle has begun but that this time the AACK/ signal remains high, that is, a collision occurs. When the waveform 44 of FIG. 5 is generated, the output of gate 61 is low and the output from gate 62 remains high. All three inputs to gate 63 are high and no signal is coupled to the clock generator. However, when the AACK/ and XACK/ signals drop in potential, the ready signal is generated and the timing is substantially as shown in FIG. 3.

Another case which can occur is a bus busy collision. In this case, the AACK/ signal drops before the XACK/. The ready signal is always after a time greater than the memory access time due to the extra clock cycle added by the flip-flop 55 for this condition.

In practice, the fact that the memory access time is reduced (compare period 35 of FIG. 5 with period 31 of FIG. 2) allows the CPU additional effective operating time and as much as 40% increase in operating time is obtained.

Thus, a method and apparatus for allowing the more rapid accessing of data from a computer system has been described. Since accessing time is reduced, the CPU is able to perform more efficiently.

I claim:

1. In a computer system which includes a central processing unit (CPU) and a dynamic memory which requires periodic refresh cycles, where said CPU provides an access signal to said memory when said memory is to be accessed and accesses data from said memory synchronized with a control clock signal after receipt of a ready signal, and wherein said memory provides a data valid signal to indicate that data is ready for reading and an advanced data valid signal which indicates that the memory is being accessed without collision with said refresh cycles, an improved method for accessing data from said memory comprising the steps of:
    initiating a timing sequence based on the occurrences of said access signal from said CPU;
    allowing said timing sequence to continue if said advanced data valid signal is present during said timing sequence; and,
    generating said ready signal at the end of said timing sequence,
    whereby the time required to access data is shortened when refresh cycles are not occurring.

2. The method defined by claim 1 wherein said ready signal is generated without regard to said data valid signal.

3. The method defined by claim 2 wherein said timing sequence includes the generation of a pulse of predetermined width generated in synchronous with said control clock.

4. The method defined by claim 3 wherein said ready signal is generated at the end of said pulse.

5. The method defined by claim 1 wherein said ready signal is generated in response to said data valid signal if said timing sequence is interrupted because of the absence of said advanced data signal.

6. In a computer system which includes a central processing unit (CPU) and a dynamic memory both of which are coupled to a bus, where said CPU provides an access signal such as memory-read and memory-write to said memory when said memory is to be accessed and senses data on said bus synchronized with control clock signals after receipt of a ready signal from a clock generator, and wherein said memory provides an acknowledge signal (XACK) to indicate that data has been coupled to said bus and an advanced acknowledge signal (AACK) to indicate that the memory is being accessed without collision with a refresh cycles needed to refresh said dynamic memory, an improved method for accessing data from said memory comprising the steps of:
    initiating a logic sequence of predetermined duration synchronized with said control clock signals on the occurrence of said access signal from said CPU;
    determining if said AACK signal is present;
    allowing said logic sequence to continue if said AACK signal is present; and,
    generating said ready signal at the end of said logic sequence,
    whereby the time required to access data is shortened when refresh cycles are not occurring.

7. The method defined by claim 6 wherein said ready signal is generated without regard to the XACK signal when said AACK signal is present.

8. The method defined by claim 7 wherein said ready signal is generated in response to said XACK signal when said AACK signal is not present during said predetermined duration.

9. The method defined by claim 8 wherein said logic sequence includes the generation of a pulse of predetermined width and wherein said ready signal is generated at the end of said pulse.

10. The method defined by claim 9 wherein said ready signal is generated in synchronous with said control clock signal and wherein said data is sensed on said bus on the occurrence of the next clock signal after said ready signal.

11. The method defined by claims 5 or 9 wherein said ready signal is generated before the occurrence of said XACK signal.

* * * * *